United States Patent
Hall

(10) Patent No.: US 10,440,891 B2
(45) Date of Patent: Oct. 15, 2019

(54) APPARATUS FOR SEPARATING PLANT MATERIAL FROM A HARVESTED PLANT

(71) Applicant: Peter Ryan Hall, North Vancouver (CA)

(72) Inventor: Peter Ryan Hall, Vancouver (CA)

( * ) Notice: Subject to any disclaimer, the term of this patent is extended or adjusted under 35 U.S.C. 154(b) by 0 days.

(21) Appl. No.: 15/653,244

(22) Filed: Jul. 18, 2017

(65) Prior Publication Data

US 2019/0021231 A1    Jan. 24, 2019

(51) Int. Cl.
| | |
|---|---|
| *A01F 7/06* | (2006.01) |
| *A01F 12/18* | (2006.01) |
| *A01F 12/56* | (2006.01) |
| *A01F 12/58* | (2006.01) |
| *A23N 15/00* | (2006.01) |

(52) U.S. Cl.
CPC .......... *A01F 7/067* (2013.01); *A01F 12/184* (2013.01); *A01F 12/56* (2013.01); *A01F 12/58* (2013.01); *A23N 15/00* (2013.01)

(58) Field of Classification Search
CPC ........ B26D 1/29; B26D 1/0006; B26D 1/147; B26D 2001/0066; A01G 22/00; A01G 5/00; A23N 15/06; A23N 15/04; A01F 7/067; A01F 12/58; A01F 12/184; A01F 12/56

See application file for complete search history.

(56) References Cited

U.S. PATENT DOCUMENTS

| | | | | |
|---|---|---|---|---|
| 3,682,400 | A * | 8/1972 | Smith | B27L 11/02 241/278.1 |
| 4,595,148 | A * | 6/1986 | Luerken | B02C 18/12 241/604 |
| 4,682,740 | A * | 7/1987 | Conigliaro | B02C 18/12 241/101.78 |
| 4,778,117 | A * | 10/1988 | Karg | B02C 18/12 241/282.2 |
| 6,179,232 | B1 * | 1/2001 | Schumacher | B02C 18/145 241/28 |
| 7,168,643 | B2 | 1/2007 | Mercier | |
| 8,596,565 | B2 * | 12/2013 | Fortin | A01D 46/005 241/282.1 |
| D755,263 | S * | 5/2016 | Raichart | D15/126 |
| D795,316 | S * | 8/2017 | Raichart | D15/127 |
| 2005/0051648 | A1 * | 3/2005 | Mercier | A01D 46/005 241/37.5 |

(Continued)

FOREIGN PATENT DOCUMENTS

WO    WO-2005086987 A1 *  9/2005  ............ A01G 17/02

*Primary Examiner* — Arpad Fabian-Kovacs

(57) ABSTRACT

An apparatus for separating plant material from a stem of a harvested plant includes a frame and a planar sheet attached to the frame having a thickness thereof and an aperture therethrough that has a length defining a longitudinal axis and a width equal to or greater than the thickness of the planar sheet, the width being operable to receive the stem when the stem is pushed through the aperture but to sever the plant material extending from the stem; and a motor-driven blade defining a cutting edge dimensioned for sweeping adjacent to one side of the planar sheet, the cutting edge being aligned with the longitudinal axis when adjacent to the aperture and operable to disintegrate a portion of the stem that protrudes through the aperture to the one side as the stem is pushed through the aperture.

17 Claims, 2 Drawing Sheets

(56) References Cited

U.S. PATENT DOCUMENTS

| | | | |
|---|---|---|---|
| 2007/0069056 A1* | 3/2007 | Shouse | A01G 3/00 241/277 |
| 2007/0271896 A1* | 11/2007 | Bonny | A01G 17/026 56/121.4 |
| 2014/0216989 A1* | 8/2014 | Raichart | B07B 1/288 209/235 |
| 2015/0027096 A1* | 1/2015 | Black | A01D 34/82 56/10.1 |
| 2016/0039105 A1* | 2/2016 | Raichart | B26D 1/147 83/13 |
| 2018/0054973 A1* | 3/2018 | Raichart | A01D 46/00 |

* cited by examiner

APPARATUS FOR SEPARATING PLANT MATERIAL FROM A HARVESTED PLANT

BACKGROUND OF THE INVENTION

1. Field of Invention

This invention relates to the processing of harvested plants and, in particular, to an apparatus for separating plant material from a harvested plant.

2. Description of Related Art

The removal of plant material, such as flower buds, from a harvested plant, such as medicinal marijuana, has traditionally been done by hand. Hand processing involves grasping and pulling each bud until the bud is separated from the remainder of the harvested plant. However, grasping and pulling buds by hand can damage the buds and is time consuming.

Current machines for separating plant material from harvested plants damage the plant material being removed, and are inefficient and costly.

An improved apparatus for separating plant material from a harvested plant is desired.

SUMMARY

The above shortcomings may be addressed by providing, in accordance with one aspect of the invention, an apparatus for separating plant material from a harvested plant, the apparatus having a frame. The apparatus includes: (a) a planar sheet attached to the frame, the planar sheet having a thickness thereof and an aperture therethrough, the aperture having a length defining a longitudinal axis and a width equal to or greater than the thickness of the planar sheet; and (b) a motor-driven blade defining a cutting edge dimensioned for sweeping adjacent to one side of the planar sheet, the cutting edge being aligned with the longitudinal axis when adjacent to the aperture.

The planar sheet may be sloped in a downwardly sloped direction toward a front of the apparatus. The planar sheet may define a path from the aperture in the downwardly sloped direction that is uninterrupted along the planar sheet. The apparatus may further include a receiving tray attached at the front of the apparatus to at least one of the planar sheet and the frame. The receiving tray may define left, right and front sides thereof, at least one of the left, right and front sides being open-walled. The receiving tray may include an entry adjacent the planar sheet. The width of the aperture may be equal to or greater than twice the thickness of the planar sheet. The apparatus may further include a cover slidably coupled to the planar sheet. The cover may be resiliently urged to cover the aperture. The cover may define a beveled edge parallel to the longitudinal axis. The apparatus may include a stopper for limiting a sliding distance of the cover. The apparatus may further include a pair of the covers resiliently urged in opposing directions. The edge of each of the covers may be beveled. Each of the beveled edges may be aligned with the longitudinal axis. The apparatus may include stoppers for limiting sliding distances of the covers, respectively. The apparatus may further include a plurality of the apertures having a plurality of corresponding lengths along a plurality of corresponding axes, respectively. The cutting edge may be aligned with the corresponding axis when the cutting edge is adjacent each of the apertures. The plurality of apertures may have a plurality of corresponding widths different from each other. The apparatus further may include a plurality of covers slidably coupled to the planar sheet and resiliently urged to cover the plurality of apertures. Each of the covers may define a beveled edge parallel to one of the corresponding axes. The apparatus may include stoppers for limiting sliding distances of the covers, respectively. The planar sheet may be sloped in a downwardly sloped direction toward a front of the apparatus. The planar sheet may define a path from each of the apertures in the downwardly sloped direction that does not intersect any other of the apertures. The apparatus may further include a receiving tray attached at the front of the apparatus to at least one of the planar sheet and the frame. The receiving tray may define left, right and front sides thereof. At least one of the left, right and front sides may be open-walled. The receiving tray may include an entry adjacent the planar sheet. One of the left, right and front sides may be open-walled.

In accordance with another aspect of the invention, there is provided an apparatus for separating plant material from a harvested plant. The apparatus includes: (a) access means for permitting access through a thickness distance, the access being limited by a length defining a longitudinal axis and by a width equal to or greater than the thickness distance; and (b) cutting means for cutting adjacent to one side of the access means, the cutting means being aligned with the longitudinal axis when adjacent to the access means.

The apparatus may further include receiving means for receiving separated plant material. The apparatus may further comprise path means for uninterruptedly guiding the separated plant material from the access means to the receiving means. The apparatus may further include cover means for resiliently covering the access means.

In accordance with another aspect of the invention, there is provided a method of separating plant material from a harvested plant, the method comprising: (a) permitting access through a planar sheet having a thickness and an aperture therethrough, the access being limited by a length of the aperture defining a longitudinal axis and by a width of the aperture equal to or greater than the thickness; and (b) cutting by a blade adjacent to one side of the planar sheet and aligned with the longitudinal axis when adjacent the aperture. The method may include receiving separated plant material into a receiving tray via a path operable to uninterruptedly guide the separated plant material from the aperture to the receiving tray. The method may include resiliently covering the aperture.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

An apparatus for separating plant material from a harvested plant includes: (a) access means for permitting access through a thickness distance, the access being limited by a length defining a longitudinal axis and by a width equal to or greater than the thickness distance; and (b) cutting means for cutting adjacent to one side of the access means, the cutting means being aligned with the longitudinal axis when adjacent to the access means.

Figure 1:
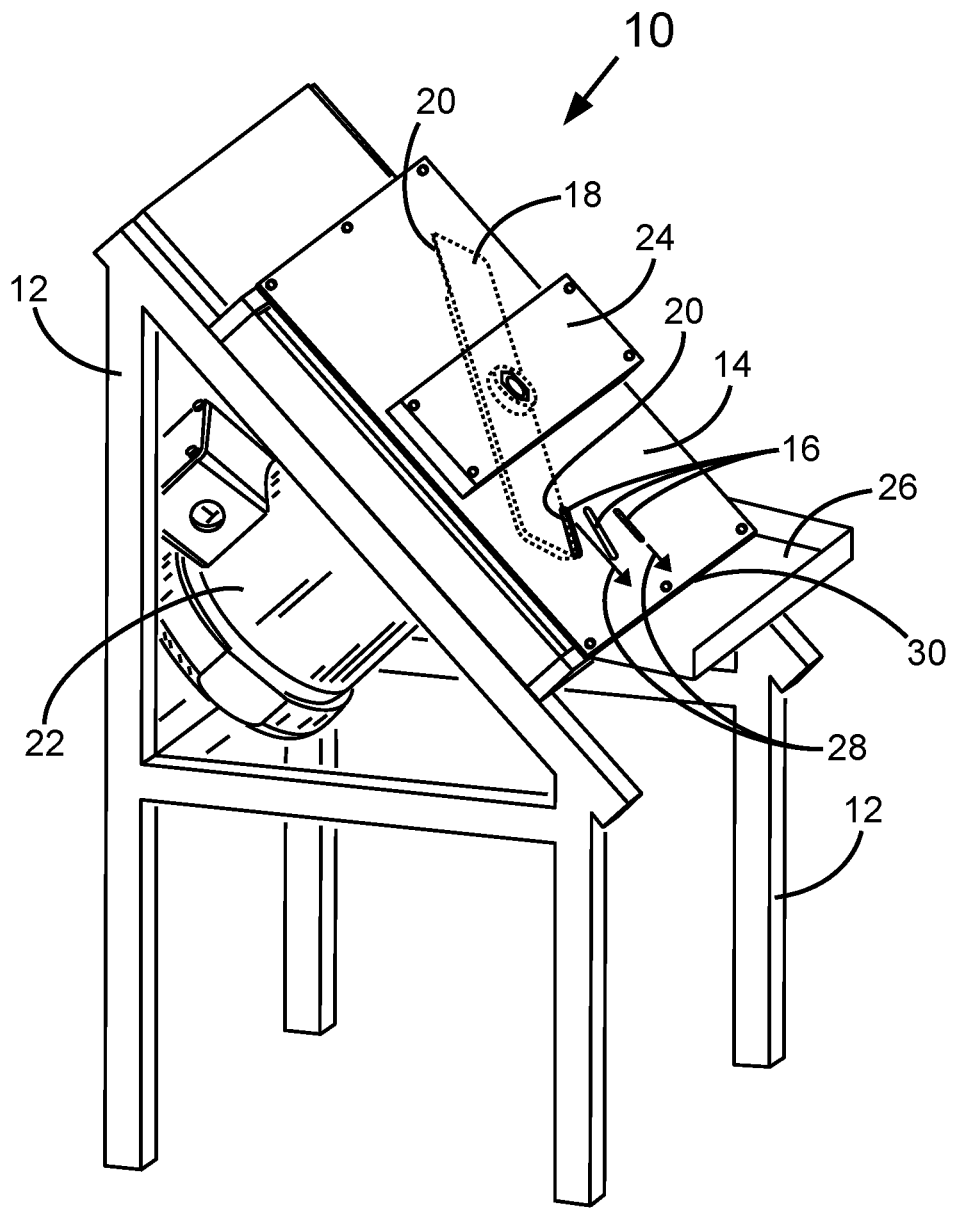
FIG. 1 is a perspective view of an apparatus for separating plant material from a harvested plant according to a first embodiment of the invention.

Referring to FIG. 1, the apparatus according to a first embodiment of the invention is shown generally at 10. The apparatus 10 is operable to separate plant material, such as flower buds, from a harvested plant, such as medicinal marijuana.

The apparatus 10 includes a frame 12, to which is attached a planar sheet, such as the cutting plate 14 shown in FIG. 1. In general, the frame 12 can have any suitable shape and/or size. The plate 14 includes one or more apertures, such as the slots 16 shown in FIG. 1. The slots 16 are elongated such that their lengths are greater than their widths.

The plate 14 is a thin plate whose thickness is less than the widths of the slots 16, and may be less than one-half of the widths of the slots 16. For example, the thickness of the plate 14 may be in the range of 3/32" (2.4 mm) to 5/32" (4.0 mm), and typically is 1/8" (3.2 mm). In the first embodiment, each slot 16 has a different width from that of the other slots 16. Typically, the larger the width of the slot 16, the longer the slot 16 is. In some embodiments a first slot 16 has a width in the range of 3/32" (2.4 mm) to 5/32" (4.0 mm), a second slot 16 has a width in the range of 5/32" (4.0 mm) to 9/32" (7.1 mm), and a third slot 16 has a width in the range of 9/32" (7.1 mm) to 11/32" (8.7 mm). For example, the first slot 16 may have a width of 1/8" (3.2 mm), the second slot 16 a width of 1/4" (6.4 mm), and the third slot 16 a width of 5/16" (7.9 mm). The slots 16 can be arranged in order of increasing/decreasing width, for example. Typically, the slots 16 have lengths in the range of 1.5" (38 mm) to 2.0" (51 mm). However, any desired slot 16 length may be employed.

In general, any number of slots of any suitable lengths and widths may be employed, provided the length is at least as large as the width and the width is at least as large as the thickness of the plate 14.

On the underside of the plate 14 is a cutting element, such as the blade 18 shown by dotted lines in FIG. 1. Generally the blade 18 is not visible from the top side of the plate 14 unless seen through one of the slots 16.

The blade 18 in the first embodiment has two cutting edges 20 on opposing sides of opposing ends of the blade 18. The cutting edge 20 is dimensioned to sweep adjacent to the underside of the plate 14, and may sweep in any suitable pattern or motion such that the cutting edge 20 is aligned with a longitudinal axis of each given slot 16 as it sweeps adjacent to that given slot 16. Preferably, the blade 18 sweeps closely to the plate 14 with a minimal or no gap between the cutting edge 20 and the plate 14, thereby creating a slicing action between each slot 16 and the cutting edge 20. In the first embodiment, the cutting edge 20 is dimensioned to extend the entire length of the slot 16.

It is notable that the alignment of the cutting edge 20 and the longitudinal axis of each slot 16 advantageously prevents a scissor-like action where slicing begins at one longitudinal end of the slot 16 and proceeds toward the other longitudinal end of the slot 16. On the contrary, in the first embodiment alignment of the cutting edge 20 and the longitudinal axis of each given slot 16 provides a straight slice across the width of the given slot 16 simultaneously at each point along the length of the given slot 16.

In the embodiment shown in FIG. 1, the blade 18 rotates so that each cutting edge 20 sweeps radially in an annular path, thus the longitudinal axis of each slot 16 extends radially for alignment with the cutting edges 20 as they sweep past each slot 16. In variations of embodiments, any number of cutting edges 20 may sweep past any number of slots 16 along any suitable path, including annular, circular, eccentric, arcuate, back-and-forth, etc.

The apparatus 10 includes a motor 22 for driving the blade 18. In the first embodiment, the motor 22 is an electric motor with a rotating output shaft (not visible) to provide the annular path of the cutting edges 20. In the first embodiment, the motor spins the blade 18 at a rate in a range between 1500 and 2000 revolutions per minute (RPM), and may spin the blade 18 at a rate of 1750 RPM so as to cause 3500 slices per minute, for example. In general, however, any suitable motor or engine may be employed and the cutting edge(s) 20 may be swept past the slot(s) 16 at any suitable rate. A motor cover 24 may be employed on the top side of the plate 14.

In some embodiments, the apparatus 10 includes a receiving tray, such as the tray 26 shown in FIG. 1 attached at the front of the apparatus 10. Additionally or alternatively, the plate 14 can be sloped or tilted to encourage separated plant material on the top side of the plate 14 to slide by gravity along a path in the downwardly sloped direction 28 toward the front of the apparatus 10 and, if present, into the tray 26. The downwardly sloped direction 28 is defined as being in the direction of the shortest path along the top side of the plate 14 between each given slot 16 and the front of the apparatus 10. In the embodiment shown in FIG. 1, the plate 14 defines a path in the downwardly sloped direction 28 for each slot 16 that is uninterrupted along the plate 14. For example, the path from any given slot 16 in the downwardly sloped direction 28 toward the front of the apparatus does not intersect any other slot 16 having a larger width than that of the given slot 16. In the embodiment shown in FIG. 1, the path from any given slot 16 in the downwardly sloped direction 28 toward the front of the apparatus does not intersect any other slot 16 at all.

In variations, the tray 26 may be attached to the frame 12, the plate 14 or both the frame 12 and the plate 14. The tray 26 may be attached by use of fasteners (not shown). Additionally or alternatively, the tray 26 may be integral to one or both of the frame 12 and the plate 14, such that the tray 26 is integrally attached.

The tray 26 shown in FIG. 1 is open-walled along an entry side 30 where the tray 26 receives the separated plant material from the top side of the plate 14, is open-walled along one other side, such as the left side shown in FIG. 1, to facilitate removal of the separated material from the tray 26, and is close-walled along the two remaining front and right sides of the tray 26 to facilitate containment of the separated plant material that is received by the tray 26. In variations, any one or more of the left, right and front sides of the tray 26 can be open-walled.

Figure 2:
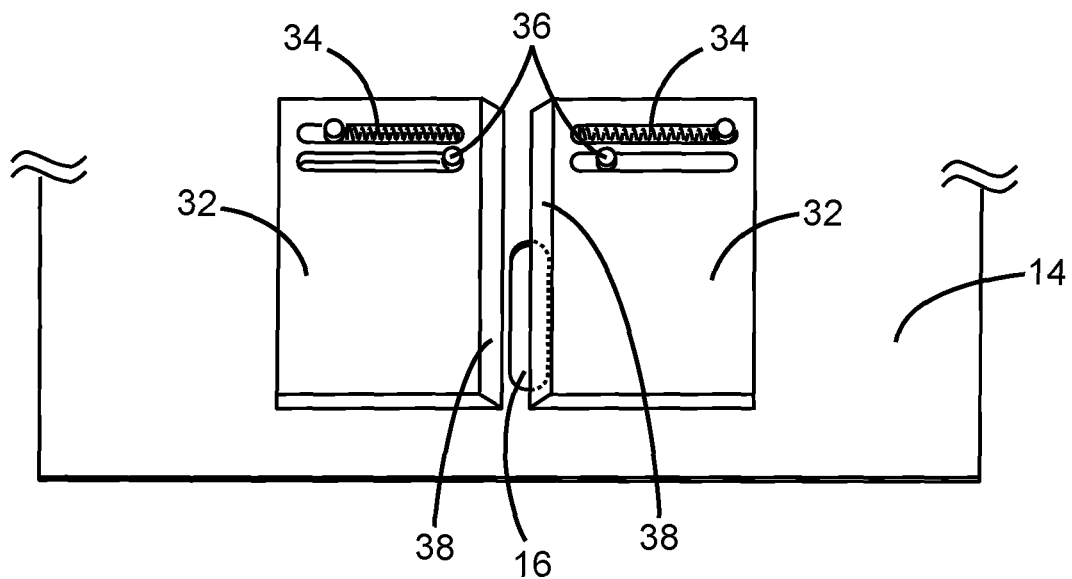
FIG. 2 is a perspective view of a portion of a cutting plate of the apparatus shown in FIG. 1, showing a pair of sliding covers.

Referring to FIG. 2, the slot 16 in the plate 14 in various embodiments may be covered by a cover, such as the pair of oppositely sliding covers 32 shown in FIG. 2. Each cover 32 of the pair is operable to cover and uncover one-half of the slot 16 by sliding in opposing directions. The cover 32 shown toward the right-side of FIG. 2 is shown covering the right-side half of the slot 16, while the cover 32 toward the left-side of FIG. 2 is shown slid away from and exposing the left-side half of the slot 16. Each cover 32 is resiliently urged to cover all or part of the slot 16, such as by use of the springs 34 such that the covers 32 are normally closed over the slot 16. Stoppers 36 limit the travel of the covers 32 away from the slots 16. In the first embodiment, the edge 38 that covers the slot 16 when the cover 32 is closed is a beveled edge, so as to advantageously facilitate slidably opening the cover 32. The beveled edge can be at any suitable angle, including in a range of angles from 20 to 70 degrees, and may be at an angle of 45 degrees for example.

While not shown in FIG. 2, any number of covers 32 may be employed for each slot 16, although one cover 32 or two oppositely sliding covers 32 are typically employed. The cover(s) 32 are disposed on the opposite side of the plate 14 from the blade 18 (FIG. 1). Some embodiments do not include any covers 32. Also not shown in FIG. 2 is an additional cover over the springs 34 and/or stoppers 36 that can be provided in a manner known to one skilled in the art, provided such additional cover does not interfere with exposure of the slot 16 when the cover(s) 32 are slid away from the slot 16.

Thus, there is provided an apparatus for separating plant material from a harvested plant, the apparatus having a frame, the apparatus comprising: (a) a planar sheet attached to the frame, the planar sheet having a thickness thereof and an aperture therethrough, the aperture having a length defining a longitudinal axis and a width equal to or greater than the thickness of the planar sheet; and (b) a motor-driven blade defining a cutting edge dimensioned for sweeping adjacent to one side of the planar sheet, the cutting edge being aligned with the longitudinal axis when adjacent to the aperture.

When operating the apparatus 10, a slot 16 is selected by the operator according to the diameter of a given branch (not shown) of the harvested plant. The motor-driven blade 18 slices the given branch as it is inserted past the cover 32 into the selected slot 16. The sliced portions of the given branch can be collected in any suitable manner beneath the plate 14, such as for disposal. Any lateral branch projecting from a main branch can be inserted with the main branch along the length of the slot 16 until the lateral branch is separated from the main branch. The separated lateral branches and any separated flower buds that are too large to fit through the selected slot 16 remain on the operator's side of the plate 14 and, in some embodiments, slide down the tilted plate 14 to be received by the tray 26. An operator can pick up separated plant material from the tray 26 for further processing, or push separated plant material out of the tray 26 at its open-walled side into another container (not shown).

Thus, there is provided a method of separating plant material from a harvested plant, the method comprising: (a) permitting access through a planar sheet having a thickness and an aperture therethrough, the access being limited by a length of the aperture defining a longitudinal axis and by a width of the aperture equal to or greater than the thickness; and (b) cutting by a blade adjacent to one side of the planar sheet and aligned with the longitudinal axis when adjacent the aperture.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. An apparatus for separating plant material from a stem of a harvested plant, the apparatus having a frame, the apparatus comprising:
   (a) a planar sheet attached to the frame, the planar sheet having a thickness thereof and an aperture therethrough, the aperture having a length defining a longitudinal axis and a width equal to or greater than the thickness of the planar sheet, the width being operable to receive the stem when the stem is pushed through the aperture but operable to sever the plant material extending from the stem; and
   (b) a motor-driven blade defining a cutting edge dimensioned for sweeping adjacent to one side of the planar sheet, the cutting edge being aligned with the longitudinal axis when adjacent to the aperture and operable to cut a portion of the stem that protrudes through the aperture to the one side as the stem is pushed through the aperture.

2. The apparatus of claim 1 wherein the planar sheet is sloped in a downwardly sloped direction toward a front of the apparatus, the planar sheet defining a path from the aperture in the downwardly sloped direction that is uninterrupted along the planar sheet for diverting the plant material that has been severed from the stem toward the front.

3. The apparatus of claim 2 further comprising a receiving tray attached at the front of the apparatus to at least one of the planar sheet and the frame.

4. The apparatus of claim 3 wherein the receiving tray defines left, right and front sides thereof, at least one of the left, right and front sides being open-walled, and wherein the receiving tray comprises an entry adjacent the planar sheet.

5. The apparatus of claim 1 wherein the width of the aperture is equal to or greater than twice the thickness of the planar sheet.

6. The apparatus of claim 1 further comprising a cover slidably coupled to the planar sheet and resiliently urged to cover the aperture.

7. The apparatus of claim 6 wherein the cover defines a beveled edge parallel to the longitudinal axis, and wherein the apparatus comprises a stopper for limiting a sliding distance of the cover.

8. The apparatus of claim 6 further comprising a pair of said covers resiliently urged in opposing directions.

9. The apparatus of claim 8 wherein the edge of each said cover is beveled, each said beveled edge being aligned with the longitudinal axis, and wherein the apparatus comprises stoppers for limiting sliding distances of the covers, respectively.

10. The apparatus of claim 1 further comprising a plurality of said apertures having a plurality of corresponding lengths along a plurality of corresponding axes, respectively, the cutting edge being aligned with said corresponding axis when the cutting edge is adjacent said each aperture.

11. The apparatus of claim 10 wherein the plurality of apertures have a plurality of corresponding widths different from each other to accommodate a plurality of stem sizes.

12. The apparatus of claim 11 further comprising a plurality of covers slidably coupled to the planar sheet and resiliently urged to cover the plurality of apertures.

13. The apparatus of claim 12 wherein each said cover defines a beveled edge parallel to one said corresponding axis, and wherein the apparatus comprises stoppers for limiting sliding distances of the covers, respectively.

14. The apparatus of claim 13 wherein the planar sheet is sloped in a downwardly sloped direction toward a front of the apparatus, the planar sheet defining a path from each said aperture in the downwardly sloped direction that does not intersect any other said aperture.

15. The apparatus of claim 14 further comprising a receiving tray attached at the front of the apparatus to at least one of the planar sheet and the frame.

16. The apparatus of claim 15 wherein the receiving tray defines left, right and front sides thereof, at least one of the left, right and front sides being open-walled, and wherein the receiving tray comprises an entry adjacent the planar sheet.

17. The apparatus of claim 16 wherein one of the left, right and front sides is open-walled.

\* \* \* \* \*